Patented Feb. 3, 1931

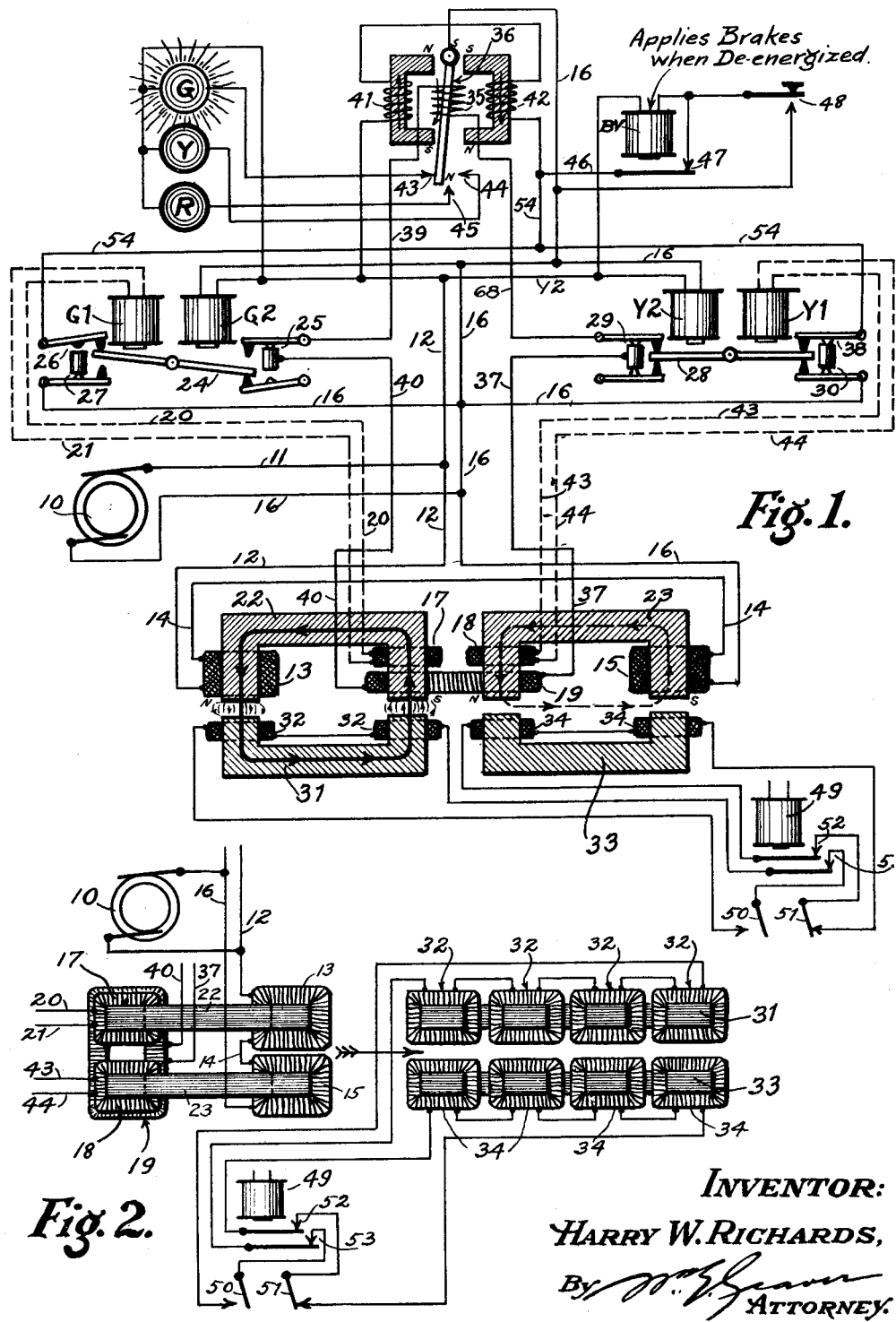

1,791,002

UNITED STATES PATENT OFFICE

HARRY W. RICHARDS, OF BALTIMORE, MARYLAND

AUTOMATIC TRAIN CONTROL

Application filed February 17, 1928. Serial No. 255,001.

The invention relates to automatic train control apparatus, whereby a plurality of cab signals, indicating traffic conditions in advance, as well as an automatic brake control, may be obtained selectively without physical contact between those parts carried on the train or vehicle and those along the roadway.

Another object of the invention is the provision of novel and improved apparatus for obtaining three condition control selectively, such as "clear", "caution" and "danger" conditions, with simple and efficient apparatus which requires no battery or other source of electrical energy on the roadside for its operation, other than that already in existence in connection with automatic block signals, the electrical energy being carried by the train.

The precise nature of my invention will best be understood by reference to the accompanying drawings forming a part of this specification, it being premised, however, that various changes may be made therein by those skilled in the art, without departing from the spirit and scope of my invention, as defined in the appended claims.

The invention is illustrated in the accompanying drawings, wherein

Fig. 1 is a diagrammatical view of the trackway apparatus and the electrical equipment to cooperate therewith which is carried by the train.

Fig. 2 is a diagrammatical plan view of a modified form of the cooperating vehicle and trackway apparatus;

Similar reference characters refer to like or similar parts.

Referring to Fig. 1, the vehicle apparatus consists of the primary windings designated as 13 and 15, and the secondary windings 17, 18 and 19 wound on two laminated structures of soft iron in the form of an inverted U, the legs of the U pointing downward to form poles which cooperate with the poles of the roadway apparatus, as hereinafter described.

The primary windings 13 and 15 are constantly energized by the alternating current generator 10, in a circuit from the generator 10, wires 11 and 12, winding 13, wire 14, winding 15, wire 16 back to generator. The magnetic flux set up in the core 22 by the primary coil 13 induces a current in the secondary coil 17, thereby energizing the electromagnet $G^1$, in a circuit from coil 17, wire 20, magnet $G^1$, wire 21, to coil 17. Likewise, the flux set up in core 23 by the primary 15, energizes the secondary coil 18, thereby energizing the electromagnet $Y^1$. The electromagnet $G^2$ is continuously energized by the generator 10, and is arranged so that its ampere turns is practically equal to the ampere turns of the magnet $G^1$ when the vehicle is not in magnetic registry with a roadway device, the magnets $G^1$ and $G^2$ thereby maintaining a balanced condition of the centrally pivoted armature 24, so that the contacts 25, 26 and 27 operated thereby will be closed.

The electromagnet $Y^2$ is also continuously energized by the generator 10, and its ampere turns is such as to maintain a balanced condition of the centrally pivoted armature 28 when the vehicle is not over a roadway device, so that the contacts 29, 30 and 38 will be closed.

The secondary winding 19 is wound so as to include one leg of each of the cores 22 and 23, and the primary coils 13 and 15 being similar in every respect, but of opposite relative polarity, the current induced in coil 19 by primary coils 13 and 15 will normally be neutralized. However, should the primary coil 13 be in magnetic registry with a roadway device 31 on which the choke coils 32 are open circuited, and the primary coil 15 be in registry with a roadway device 33 on which the choke coils 34 are in closed circuit, the soft iron core 31 will form a path of low reluctance for the flux of coils 13, so that the current induced in coil 19 by the primary 13 will be greatly increased. The choke coils 34 being in closed circuit the flux from coil 15 cannot enter the soft iron core 33, and therefore there will be no increase of flux in the core 22. Therefore, the flux in core 22 being greater than the flux in core 23, a current will be induced in coil 19 of a relative polarity corresponding to the flux in the core 22.

The current thus induced in coil 19 energizes the winding 35 to relatively polarize the armature 36 of a two-element three-position relay, in a circuit from coil 19 through wire 37, contact 29, wire 68, relay coil 35, wire 39, contact 25, wire 40 to coil 19. Relay coils 41 and 42 are constantly energized by the generator 10 in a circuit which includes the contacts 26 and 27 connected in parallel with the contacts 30 and 38, so that the relay coils 41 and 42 will be energized as long as the circuit from 26 to 27 or from 30 to 38 is closed. The armature 36 will be attracted to the right or left position in accordance with the relative polarity of the current energizing the coil 35, and its relation to the relative polarity of coils 41 and 42. Electrical connection to the armature 36 is made with the generator 10, by wire 16, so that when the armature is attracted to the left the contact 43 establishes the circuit to and through the green cab signal light. When attracted to the right, the green light is extinguished and the circuit to and through the yellow light, through contact 44, is completed. Should the coils 41 and 42 become deenergized the armature will move by gravity to the middle position so as to establish the circuit through the contact 45 to and through the red cab light. While it is true that the armature 36 does make contact with 45 at each transit to right and left, the red light will not be visible, as the time that the circuit is closed is too short to allow the filament to glow. It might here be stated that the legends N and S, as applied to the inductors and the relay 36, 41, 42, indicate the instantaneous polarity during a half-cycle of the alternating current, so that the operation of the device may be more clearly understood. At the inductor the legends show clearly that there is a difference of 180 degrees in phase between the flux in the member 22 and that of member 23, and that the current in coil 19 will be neutralized as long as the flux in two members is of equal amount. The legends as applied to the poles and armatures of the relay show why the armature 36 is attracted by one side and repelled by the other side.

An electromagnet or solenoid BV is provided for controlling an air valve or other means adapted to apply the brakes when deenergized. A circuit from wire 16, contacts 26 and 27 (or contacts 30 and 38) through wire 46, contact 47, magnet BV and wire 12 to generator 10, forms a stick circuit. After the magnet BV has been de-energized, as hereinafter explained, it will remain de-energized until the push button 48 is closed, to establish a circuit from the generator directly to the magnet coil BV to restore it.

The roadway is equipped with apparatus at such points or locations as traffic conditions may require which apparatus consists of the laminated core or structure 31, formed to provide upwardly extending pole pieces on which are wound the choke coils 32, and located on the roadway in position to register magnetically with the poles of the vehicle structure 22. Likewise, the member 33 is of laminated construction, and formed to provide upwardly extending pole pieces, on which are wound the choke coils 34, and which is located in position to register with the poles of the vehicle structure 23.

Each track apparatus installation includes a relay, or other suitable device, for controlling the circuits to the choke coils 32 and 34, so as to cause the circuits to one or the other, or both, of the choke coils to be open, in accordance with traffic conditions. Relay 49 may be of the usual polarized type, controlled or operated by the track circuit of the automatic block signal system, and having polarized armatures 50 and 51, which are swung to the right at a "clear" signal location, and swung to the left at a "caution" signal location, and having neutral armatures which open contacts 52 and 53 when the signal indication is "stop". When swung to the right the armature 50 is away from its contact so the circuit through choke coils 32 will be open, while the armature 51 is against its contact, thereby closing the circuit through the choke coils 34. When the relay 49 is de-energized, as at a "stop" signal location, the contacts 52 and 53 will be opened, thereby causing the circuits to both choke coils 32 and 34 to be open. When the circuit through the choke coils 32 is open, the laminated structure 31 will form a path of low reluctance for the magnetic flux of the primary coil 13 on the vehicle structure 22. Should the circuit be closed through the coils 32, the choking effect of said coils on the pole pieces sufficiently prevents the flux from the primary coil 13 from entering the structure 31, so there will be practically no effect on the flux in the vehicle structure 22. The opening of the circuit through coils 34 will cause an increased flux flow through the vehicle structure 23 due to the path of low reluctance formed, and the closing of the circuit through coil 34 will permit the vehicle member 23 to pass over the member 33 undisturbed.

*Operation of the device at a "clear" signal*

Relay 49, operated by the track circuit of the block signal system will be energized and its polarized armatures 50 and 51 will be swung to the right, thereby opening the circuit to choke coils 32 and closing the circuit through coils 34. The roadway member 31 will form a path of low reluctance, thereby causing an increased magnetic flux to flow in the vehicle member 22, which member includes the secondary windings 17 and 19. The increased flux in the core 22 causes an increased voltage to be induced in the winding 17 which is in circuit with the magnet $G^1$. The electromagnet $G^1$, is now being energized with higher voltage and more current, the effect of its ampere turns is correspondingly increased, so that it has greater attraction on the armature 24 than does the constantly energized magnet $G^2$, thereby causing the armature 24 to be tilted from its normal or balanced position, opening the contact 26.

The circuit through choke coils 34 being closed by the armature 51, the amount of flux in the vehicle member 23 will remain practically normal, so that the ampere turns of the magnet $Y^1$ will not be affected, and the contacts 30 and 38 will be maintained closed so as to cause the relay windings 41 and 42 to be energized by the generator 10.

The flux in the member 22 is of relative polarity opposite to the flux in the member 23 but is now much greater in amount so that winding 19, which includes one leg of each member, will have a current induced therein of a relative polarity corresponding to the flux in the member 22. The contacts 25 and 29 being closed, the circuit is complete for the winding 35 to be energized by the coil 19, so as to relatively polarize the armature 36, causing it to be attracted to the left by the coil 41 and repelled by the coil 42.

The contact 43, now being closed, the circuit is established to and through the green or "clear" signal light, in the vehicle cab, and the current supplied over contact 38, and wires 54 and 46 will maintain the electromagnet BV energized. Since an application of the brakes only occurs when the magnet BV is deenergized it will thus be seen that the vehicle may continue in its travel at undiminished speed.

When the vehicle passes from off the track apparatus the flux in the members 22 and 23 will again be of equal amount, so that the magnet $G^1$ will be equal in ampere turns to that of the magnet $G^2$, permitting the armature 24 to resume its normal balanced position with all contacts closed. The current induced in coil 19 by the member 22 being again equal to that induced by the member 23, the current in coil 19 will be neutralized so that the winding 35 will become deenergized. The armature 36, being in contact with the poles of winding 41, which is still energized, will be held to the left so as to maintain the green light, until the next signal location point is reached.

*Operation of the device at a "caution" signal*

When the traffic conditions ahead are such as to warrant or necessitate a more cautious proceeding of the vehicle in order to avoid accidents, the track relay 49 will have its polarized armatures swung to the left, as heretofore described. Thereupon, the circuit through coils 32 will be closed, and the circuit through coils 34 will be open. The track structure 33 will now be the path of low reluctance, so that the flux will be increased in the vehicle member 23 when it passes over said structure 33 causing an increased voltage to be induced in winding 18, thereby causing the magnet $Y^1$ to attract and tilt the armature 28, so as to open the contact 38. The flux in the member 22 not being affected by the track member 31, the ampere turns in magnet $G^1$ will not be affected, so that the contacts 26 and 27 will be closed so as to maintain the windings 41 and 42 energized. The winding 19, now receiving an increased flux from the member 23, will cause a current to flow in the circuit including the winding 35, relatively polarizing the armature 36. The relative polarity of the flux in the member 23 being opposite to that in the member 22, the current supplied to the winding 35 will be of a relative polarity opposite to that supplied at a "clear" signal thereby causing the armature 36 to be attracted by coil 42 and repelled by coil 41 causing said armature to swing to the right as seen in the drawings. Armature 36, now being in contact with the contact point 44, the circuit to the green light is broken but the circuit to and through the yellow light Y is completed. The current supplied over contact 26 and wires 54 and 46 maintains the electromagnet BV energized so that no automatic brake application is made.

When the vehicle passes from off the track members 22 and 23, the current will again be normal in the winding 18, thereby permitting the armature 28 to return to its balanced position and close the contact 38. The armature 36 will be maintained in its position to the right by the coil 42.

*Operation of the device at a "stop" signal*

When the vehicle reaches a "stop" signal the relay 49 will be in de-energized condition, as heretofore explained so that the circuits to coils 32 and 34 will be opened by the dropping of contacts 52 and 53. Both members 31 and 33 will now be in condition to form a path of low reluctance, so the increase of magnetic flux will occur in both vehicle members 22 and 23, thereby causing an increase of current in coils 17 and 18, and the tilting of both armatures 24 and 28. The contacts 26 and 38, both being open, the circuit to each of the relay coils 41 and 42 is broken, releasing the armature 36 and permitting it to assume a position midway between the coils 41 and 42, the flux being increased a like amount in both members 22 and 23, the current in coil 19 will still be neutralized so that there will be no current flow to the winding 35 and the armature 36 will not be magnetized. The contact 44 being opened, the circuit to the yellow light is broken, but the circuit 45 will be completed. Contacts 26 and 38 being open produces a break in the circuit energizing the brake control magnet BV, thereby causing an automatic application of the brakes. When magnet BV is de-energized it releases its armature so as to open the contact 47, thereby making it necessary to close the push button 48 to restore the magnet BV.

As the vehicle passes from off the track members, the current in the magnets $G^1$ and $Y^1$ will again be normal, releasing the armatures 24 and 28 from their unbalanced positions and closing the contacts 26 and 38. The circuit now being complete, the windings 41 and 42 will again be energized, and the brake magnet BV will be maintained energized after the push button 48 has been operated to close contact 47. Armature 35 will remain in its middle position between the coils 41 and 42, since attraction of the coil 41 is equal to that of coil 42.

As a matter of safety the circuit to coil 35 includes the contacts 25 and 29, so that, should either primary coil 13 or 15 be damaged so as to reduce the flux in their respective members, the pull of magnets $G^1$ or $Y^1$ would be less than the normal amount necessary to maintain a balanced condition of the armatures 24 and 28. As a result the magnets $G^2$ and $Y^2$ would cause their respective armatures to be tilted in directions opposite to that above described, thereby opening contacts 25 and 27 of armature 24, or contacts 29 and 30 of armature 28, which opens all circuits to the relay coils 35, 41 and 42, and also to the magnet BV, causing an automatic application of the vehicle brakes.

In Figure 2 is shown a modified form of the roadside and vehicle inductors. In this figure it will be seen that the roadside inductor comprises two separated laminated core members each provided with a plurality of magnetic poles 31 and 33 each of which poles has wound thereabout the coils 32 and 34 respectively, said coils being in tandem arrangement on each laminated core member.

The vehicle inductor comprises two core members of laminated material 22 and 23 disposed relatively to each other in the same relationship as are the core members of the roadside inductor so that when the vehicle passes the latter there is a perfect magnetic registry of the two inductors. The vehicle inductor has at one end of each core member a primary coil such as indicated at 13 and 15 connected in series with the alternating current generator 10. At the other end of each core member is a secondary winding such as indicated at 17 and 18 and the common coil 19 wound about a magnetic pole of both core members.

From the foregoing description and operation it will therefore be seen that by this construction there is provided a train control system including a plurality of track sections insulated from each other having associated circuits controlled by traffic conditions through relays or magnets such as indicated at 49, and each track section further provided with a track inductor influenced by said circuits. In combination with this there is a train inductor associated with a second set of circuits including signals such as the G, Y and R lamps and magnets such as $G^1$ and $Y^1$ carried by the train, the train inductor adapted to move over each track inductor and be influenced by the circuits of the latter. Also there is provided a source of alternating current in the generator 10 carried by the train and associated with the second set of circuits above mentioned and further joined to the primary coil carried by the train inductor. Lastly there is a safety means comprising the magnets $G^2$ and $Y^2$ actuated by the defunctioning of the train inductor coil to stop the train through the brake applying magnet BV. The primary coil on the train inductor is continuously energized under normal operating conditions but when the energy created therein substantially decreases, the magnets $G^2$ and $Y^2$ will have passed therethrough the induced currents stronger than the currents passing through their companion magnets $G^1$ and $Y^1$ with the result that the armature such as 24 common to the pair of magnets such as $G^1$ and $G^2$ will be turned about its central pivot into a position to open a circuit through the contact member such as 25. When this occurs the BV magnet will be de-energized and an application of brakes will follow. It results from the construction herein disclosed that whenever there is created a difference in voltage between the magnets such as $G^1$ and $G^2$ or $Y^1$ and $Y^2$ to make the voltage through $G^2$ and $Y^2$ greater, there will be an application of brakes thus establishing a safety feature in the system.

In connection with the armature 24 or 28 of the pair of magnets $G^1$ and $G^2$ or $Y^1$ and $Y^2$, it should be stated that the contact points such as 25, 26 and 27 or 29, 30 and 38 are mounted on spring control members so that when said contacts are open there will be a slight spring pressure placed upon the end of the magnet armatures 24 or 28, with the result that when conditions are restored through said magnets to make the same become balanced, then the armatures will be affected by said spring pressure to cause the same to more quickly reach and be held in a balanced relationship with respect to the magnets as will be readily understood. As above stated the magnets $G^1$ and $G^2$ are of substantially the same magnitude or in other words have approximately the same ampere turns so that they are truly balanced and it is only when this balance is upset that the armature associated therewith will turn about its pivot to close the selective circuit and in accordance with the traffic conditions. Each armature 24 and 28 in its preferred form consists of a straight bar of metal provided with a pivot at its center and between the associated pair of magnets, so that either magnet may attract and hold one of the ends of said armature according to the governing conditions in the circuits. It is to be noted in Figure 1 that there is provided a contact member opposite to the contact 25, and another contact member opposite to the contact 29, which are unconnected in circuit. The purpose of providing these isolated contact members which are also governed by springs as above described, is to create spring pressure on the end of the armatures 24 and 28 equal to the diagonally opposite contact members 26 and 38 respectively.

It is obvious that those skilled in the art may vary the details of construction as well as arrangements of parts without departing from the spirit of the invention and it is therefore not desired to be limited to the above disclosure except as may be required by the claims.

What is claimed is:—

1. In a train control the combination of a track inductor influenced by traffic controlled circuits; a train inductor adapted to move over the track inductor and be influenced by said circuits; a primary coil on the train inductor and an electromagnet carried by the train each constantly energized from a source of pulsating current; a train carried closed circuit including a second electromagnet and a secondary coil on the train inductor receiving induced current from the magnetic flux created in said inductor by said primary coil, a relay and a shunt circuit therefor, said circuit normally connected in parallel with said primary coil and including a switch adapted to be opened by the unbalancing of said electromagnets; a second train carried closed circuit including a winding on the armature of said relay, a coil on said train inductor, and a switch adapted to be opened by a different unbalancing of said electromagnets; and train carried signal and control devices subject to the variations of said electromagnets.

2. In a train control the combination of a track inductor influenced by traffic controlled circuits; a train inductor adapted to move over the track inductor and be influenced by said circuits; a primary coil on the train inductor and an electromagnet carried by the train each constantly energized from a source of pulsating current; a train carried closed circuit including a second electromagnet and a secondary coil on the train inductor receiving induced current from the magnetic flux created in said inductor by said primary coil, said first and second named electromagnets being in balance under normal traffic conditions; a relay and a shunt circuit therefor, said circuit normally connected in parallel with said primary coil and including a switch adapted to be opened when the force of either magnet is made greater than the other by a change in said traffic control circuits; a second train carried closed circuit including a winding on the armature of said relay, a coil on said train inductor, and a switch adapted to be opened when the force of the magnet associated with said primary coil is made greater than the force of the other magnet by a different change in said traffic control circuits; and train carried signal and control devices subject to the variations of said electromagnets.

3. In a train control the combination of a track inductor influence by traffic controlled circuits; a train inductor adapted to move over the track inductor and be influenced by said circuits; a primary coil on the train inductor and an electromagnet carried by the train each constantly energized from a source of pulsating current; a train carried closed circuit including a second electromagnet and a secondary coil on the train inductor receiving induced current from the magnetic flux created in said inductor by said primary coil, said first and second named electromagnets being in balance under normal traffic conditions; a relay and a shunt circuit therefor, said circuit normally connected in parallel with said primary coil and including a switch adapted to be opened by the unbalancing of said electromagnets in one direction; a second train carried closed circuit including a winding on the armature of said relay, a coil on said train inductor, and a switch adapted to be opened by the unbalancing of said electromagnets in the other direction; and train carried signal and control devices subject to the variations of said electromagnets.

4. In a train control the combination of a track inductor influenced by traffic controlled circuits; a train inductor adapted to move over the track inductor and be influenced by said circuits; a primary coil on the train inductor and an electromagnet carried by the train each constantly energized from a source of pulsating current; a train carried closed circuit including a second electromagnet and a secondary coil on the train inductor receiving induced current from the magnetic flux created in said inductor by said primary coil, said first and second named electromagnets being in balance under normal traffic conditions; a relay and a shunt circuit therefor, said circuit normally connected in parallel with said primary coil and including a switch adapted to be opened by the unbalancing of said electromagnets due to an increase of current through the electromagnet associated with said secondary coil; a second train carried closed circuit including a winding on the armature of said relay, a coil on said train inductor, and a switch adapted to be opened by a different unbalancing of said electromagnets; and train carried signal and control devices subject to the variations of said electromagnets.

5. In a train control the combination of a track inductor influenced by traffic controlled circuits; a train inductor adapted to move over the track inductor and be influenced by said circuits; a primary coil on the train inductor and an electromagnet carried by the train each constantly energized from a source of pulsating current; a train carried closed circuit including a second electromagnet and a secondary coil on the train inductor receiving induced current from the magnetic flux created in said inductor by said primary coil, said first and second named electromagnets being in balance under normal traffic conditions; a relay and a shunt circuit therefor, said circuit normally connected in parallel with said primary coil and including a switch adapted to be opened by the unbalancing of said electromagnets due to an increase of current through either; a second train carried closed circuit including a winding on the armature of said relay, a coil on said train inductor, and a switch adapted to be opened by an unbalancing of said electromagnets due to an increase of current through the magnet associated with said primary coil; and train carried signal and control devices subject to the variations of said electromagnets.

6. In a train control the combination of a track inductor influenced by traffic controlled circuits; a train inductor adapted to move over the track inductor and be influenced by said circuits; a primary coil on the train inductor and an electromagnet carried by the train each constantly energized from a source of alternating current; a train carried closed circuit including a second electromagnet and a secondary coil on the train inductor receiving induced current from the magnetic flux created in said inductor by said primary coil, said first and second named electromagnets being in balance under normal traffic conditions; a normally balanced armature common to both electromagnets; a relay and a shunt circuit therefor, said circuit normally connected in parallel with said primary coil and including a switch adapted to be opened by said armature upon its attraction to the more strongly influenced of said electromagnets; a second train carried closed circuit including a winding on the armature of said relay, a coil on said train inductor, and a switch adapted to be opened by said armature upon its increased attraction to the electromagnet associated with said primary coil; and train carried signal and control devices subject to the variations of said electromagnets.

7. In a train control the combination of a track inductor influenced by traffic controlled circuits; a train inductor adapted to move over the track inductor and be influenced by said circuits; a primary coil on the train inductor continuously energized from a source of pulsating current; a train carried closed circuit including an electromagnet and a secondary coil on the train inductor receiving induced current from the magnetic flux created in said inductor by said primary coil, and a switch adapted to be opened by an increased or decreased current in said electromagnet; a second secondary coil on said train inductor receiving induced current from the magnetic flux created by said primary coil, said current being normally neutralized, and adapted to be energized by said induced current when the train inductor is influenced by said track inductor under one condition, and to remain in the normal neutralized condition when influenced by the track inductor under a different condition, said conditions being obtained selectively; a relay and a shunt circuit therefor, said circuit normally connected in parallel with said primary coil; a second train carried closed circuit including a winding on said relay and the second named secondary coil on the train inductor; and train carried signal and control devices subject to the variations in said electromagnet and said relay.

In testimony whereof I affix my signature.
HARRY W. RICHARDS.